(12) United States Patent
Jung et al.

(10) Patent No.: US 12,399,048 B2
(45) Date of Patent: Aug. 26, 2025

(54) REMOTE METERING SYSTEM USING AN ULTRASONIC WATER METER

(71) Applicant: KED Co., Ltd., Gumi-si (KR)

(72) Inventors: Tae Hwa Jung, Gumi-si (KR); Jung Beom Lee, Daegu (KR); Jae Woo Lee, Busan (KR)

(73) Assignee: KED Co., Ltd., Gumi-si (KR)

(*) Notice: Subject to any disclaimer, the term of this patent is extended or adjusted under 35 U.S.C. 154(b) by 528 days.

(21) Appl. No.: 17/971,768

(22) Filed: Oct. 24, 2022

(65) Prior Publication Data

US 2023/0304839 A1 Sep. 28, 2023

(30) Foreign Application Priority Data

Feb. 28, 2022 (KR) .................. 10-2022-0026144

(51) Int. Cl.
*G01F 1/667* (2022.01)
*G01F 1/66* (2022.01)

(52) U.S. Cl.
CPC .............. *G01F 1/662* (2013.01); *G01F 1/667* (2013.01); *Y04S 20/30* (2013.01)

(58) Field of Classification Search
CPC ........... G01F 1/662; G01F 1/667; Y04S 20/30
See application file for complete search history.

(56) References Cited

U.S. PATENT DOCUMENTS

2006/0059977 A1* 3/2006 Kates .................. G01M 3/2807
73/40
2021/0381207 A1* 12/2021 Brotherton .............. E03B 7/071

FOREIGN PATENT DOCUMENTS

| KR | 20110075072 A | 7/2011 |
| KR | 101463470 B1 | 11/2014 |
| KR | 101827949 B1 | 2/2018 |
| KR | 102143569 B1 | 8/2020 |
| KR | 10-2212130 B1 | 2/2021 |
| KR | 10-2435486 B1 | 8/2022 |

* cited by examiner

*Primary Examiner* — Jennifer Bahls
(74) *Attorney, Agent, or Firm* — NKL Law; Jae Youn Kim

(57) ABSTRACT

Proposed is a remote metering system using an ultrasonic water meter, which can minimize power consumption by adopting a low power wide area communication network and a low power design optimized for a power usage according to a transmission cycle when metering data is transmitted by radio so as to extend a replacement cycle of a battery, thereby minimizing maintenance costs due to battery replacement.

11 Claims, 15 Drawing Sheets

| Customer management | | | | | | |
|---|---|---|---|---|---|---|
| Customer number ∨ | Search 🔍 | | | | | + 🗀 help |
| Number | Customer number | Customer name | Administrative district code | Belong | Metering method | Customer address |
| 70 | Uman 1ri-70 | Jinjae Jeong | Pungyang-myeon | Yecheon-gun | Remote meter reading | 326-4, Uman-ri, Pungyang-myeon, Yecheon-gun, Gyeongsangbuk-do |
| 69 | Uman 1ri-69 | Jeong Chul-woo | Pungyang-myeon | Yecheon-gun | Remote meter reading | 326-6, Uman-ri, Pungyang-myeon, Yecheon-gun, Gyeongsangbuk-do |
| - | - | - | - | - | - | - |
| - | - | - | - | - | - | - |
| - | - | - | - | - | - | - |
| - | - | - | - | - | - | - |
| - | - | - | - | - | - | - |
| - | - | - | - | - | - | - |
| - | - | - | - | - | - | - |

| Customer management registration | |
|---|---|
| Customer number * | |
| Customer name * | |
| Administrative district code * | Select ˅ Select ˅ Select ˅ |
| Customer address * | |
| Block division * | Select ˅ Select ˅ Select ˅ |
| Belong * | Choose |
| Elderly living alone * | Yes ˅ |
| Metering method * | Choose ˅ |
| Note * | |

Registration　List

FIG. 10

Revision of customer management

Customer number*

Customer name*

Administrative district code*  Select

Customer address*

Belong*  Select

Elderly living alone identification*  Select

Metering method*

[Save] [Delete] [List]

FIG. 11

Meter reading history management

| | All | Normal | Overflow | Reflux | Indoor leak | Obesity tube | Elderly living alone | Low battery | Freeze warning | Wired communication | Wireless communication | Long-term nonuse |
|---|---|---|---|---|---|---|---|---|---|---|---|---|
| | 70 | 68 | 0 | 0 | 1 | 1 | 0 | 0 | 0 | 0 | 0 | 2 |

| Select ∨ | All ∨ | Customer number ∨ | Search | | | | | | | | | |

| No | Customer number | Customer name | Region | Meter reading type | Metering method | Metering time | Usage | Addition | | Meter reading status | Management |
|---|---|---|---|---|---|---|---|---|---|---|---|
| 70 | Uman 1ri-70 | Jinjae Jeong | Pungyang-myeon | Pungyang-myeon | Remote examination | 2022-01-07 16:00 | 0.01701 | 143.83345 | Q4 ■×*△▷ | ⑨⋐≛ | ○ |
| | - | - | - | - | - | - | - | - | - | - | - |
| | - | - | - | - | - | - | - | - | - | - | - |
| | - | - | - | - | - | - | - | - | - | - | - |
| | - | - | - | - | - | - | - | - | - | - | - |
| | - | - | - | - | - | - | - | - | - | - | - |
| | - | - | - | - | - | - | - | - | - | - | - |
| | - | - | - | - | - | - | - | - | - | - | - |
| | - | - | - | - | - | - | - | - | - | - | - |

[1] [2] [3] [4] [5] [6] [7]

◇ Data monitoring
  Customer and metering equipment management
  Collected data management
  Meter reading history management
  Upload meter reading data
  Collected data analysis
  System management

- Data monitoring
- Customer and metering equipment management
- Collected data management
- Collected data analysis
- System management
  - System setting
  - Security management
  - User management
  - Code management

| System setting | |
|---|---|
| Metering error setting | |
| Long-term nonuse | The long-term nonuse is checked as 0 every hour and a warning is generated when the long-term nonuse is continuously generated for more than a predetermined time 24 hours |
| Wireless communication error | An error is checked every hour and a warning is generated when the error is continuously generated for more than a predetermined time 12 hours |
| Wired communication error | An is checked every hour and a warning is generated when the error is continuously generated for more than a predetermined time 12 hours |
| Freeze warning | An error checks an error every hour and a warning is generated when the error is continuously generated for more than a predetermined time 3 hours |
| Low battery | An error is checked every hour and a warning is generated when the low battery is continuously generated for more than a predetermined time 1 hour |
| Elderly living alone | An error is every hour and a warning is generated when the error is continuously generated for more than a predetermined time 72 hours |
| Partly filled pipe | An error is checked every hour and a warning is generated when the error is continuously generated for more than a predetermined time 48 hours |
| Interior leakage | An error is checked every hour and a warning is generated when the error is continuously generated for more than a predetermined time 4 hours |
| Backflow | An error is checked every hour and a warning is generated when the error is continuously generated for more than a predetermined time 12 hours |
| Overflow | An error is checked every hour and a warning is generated when the error is continuously generated for more than a predetermined time 12 hours |

FIG. 14

REMOTE METERING SYSTEM USING AN ULTRASONIC WATER METER

BACKGROUND OF THE INVENTION

Cross Reference to Related Application of the Invention

The present application claims the benefit of Korean Patent Application No. 10-2022-0026144 filed in the Korean intellectual Property Office on Feb. 28, 2022, the entire contents of which are incorporated herein by reference.

FIELD OF THE INVENTION

The present invention relates to a remote metering system using an ultrasonic water meter, which can minimize power consumption by adopting a low power wide area communication network and a low power design optimized for a power usage according to a transmission cycle when metering data is transmitted by radio so as to extend a replacement cycle of a battery, thereby minimizing maintenance costs due to battery replacement.

BACKGROUND ART

In general, a water meter is used to measure a flow rate of tap water. The water meter is divided into a mechanical flowmeter and an ultrasonic flowmeter.

The mechanical flow meter measures the number of rotations of wings rotating by a fluid flow to measure the flow rate.

However, the mechanical flowmeter has a disadvantage in that the wings or a shaft of the wings is worn and a flow rate measurement error is gradually increased as use time goes by. So, the ultrasonic flowmeter is in the spotlight as an alternative.

That is, the ultrasonic flowmeter measures the flow rate using a pair of ultrasonic transducers mounted to be spaced apart from each other in the flow direction of the fluid. That is, the ultrasonic flowmeter obtains the velocity of the fluid by using a difference between time that ultrasonic waves transmitted from one of the pair of ultrasonic transducers are propagated to the other one and time that ultrasonic waves transmitted from the other of the pair of ultrasonic transducers are propagated to the one, and calculates a flow rate by multiplying the velocity of the fluid by the cross-sectional area of a pipe.

Meanwhile, the ultrasonic transducer is mainly mounted on the outer surface of the pipe. In this instance, in a case in which temperature of the fluid flowing in the pipe is very low, dew condensation is generated on the outer surface of the pipe due to a difference in temperature between the fluid flowing in the pipe and the external air, and thus, the moisture causes a failure of the ultrasonic transducer.

Such a problem was solved by an "ultrasonic water meter for minimizing effect of external temperature change" pre-registered by the inventor of the present invention.

The conventional ultrasonic water meter for minimizing effect of external temperature change includes: a water pipe connector communicating with a water pipe; a housing having a pair of protrusions formed on one surface to be spaced apart from each other in the flow direction of the fluid flowing through the water pipe connector and having respective ends penetrate between an outer wall and an inner wall of the water pipe connector; a pair of ultrasonic transducers each accommodated in the pair of protrusions; a plurality of reflectors respectively mounted on the inner wall of the water pipe connector at every intersecting points of a W structure of a ultrasonic path, in which ultrasonic waves transmitted from one of the pair of ultrasonic transducers are reflected and propagated to the other one; and a guide part mounted on the ultrasonic path.

Accordingly, the conventional ultrasonic water meter for minimizing effect of external temperature change provides an advantage to minimize an effect caused by an external temperature change for protecting the ultrasonic transducer from a temperature change of the fluid flowing in the pipe.

However, the conventional ultrasonic water meter for minimizing effect of external temperature change has a disadvantage in that it requires lots of labor costs for maintenance since using a great deal of power consumption when metering data is transmitted by radio and it causes frequent replacement of a battery mounted on the water meter.

PATENT LITERATURE

Patent Documents

Patent Document 1: Korean Patent Publication No. 10-22112130 B1

SUMMARY OF THE INVENTION

Accordingly, the present invention has been made to solve the above-mentioned problems occurring in the prior arts, and it is an object of the present invention to provide a remote metering system using an ultrasonic water meter, which can minimize power consumption by adopting a low power wide area communication network and a low power design optimized for a power usage according to a transmission cycle when metering data is transmitted by radio so as to extend a replacement cycle of a battery, thereby minimizing maintenance costs due to battery replacement.

To accomplish the above object, according to the present invention, there is provided a remote metering system using an ultrasonic water meter including: an ultrasonic water meter, which includes: an ultrasonic sensor unit communicating with a water pipe connector through which a fluid passes, irradiating ultrasonic waves to the fluid passing through the water pipe connector through the pair of ultrasonic transducers, measuring a difference between a first time that ultrasonic waves transmitted from one side are propagated to the other side through a reflector and a second time that the ultrasonic waves transmitted from the other side are propagated to the one side through the reflector, and generating a sensing signal; an information output unit for outputting metering-related information of the water meter; an information storage unit storing metering-related information of the water meter; an information communication unit performing a communication interface function in which meter-related information of the water meter is transmitted and received; a central processing unit receiving the sensing signal through the ultrasonic sensor unit, calculating the velocity of the fluid by the input sensing signal using the difference between the first time and the second time, multiplying the calculated velocity of the fluid by the cross-sectional area of the pipe connector to generate metering data, which is the calculated flow rate, for every predetermined cycle, and controlling the data to be transmitted through the information output unit by cable; and a power supply unit for supplying power for driving; and a remote metering device receiving the metering data from the ultrasonic water meter for every determined cycle by cable or wirelessly. The predetermined cycle of the metering data is at least once per hour. The power supply unit is a lithium battery, capacity of the lithium battery is 3,650,000 μAh, the voltage of the lithium battery is 3.6 V, current consumption per hour is 43.33333 μAh, a self-discharge rate is 36,500 μAh per year, and the expected lifespan is at least eight years.

Moreover, the remote metering system according to the present invention further includes a metering server connected with the remote metering device via a low power wide area communication network and receiving the metering data from the remote metering device for every predetermined cycle, wherein the low power wide area communication network is composed of any one or combination of a LoRa communication network, and a NBIoT communication network.

Furthermore, the remote metering system according to the present invention further includes a temperature sensing unit embedded in the ultrasonic water meter to generating a temperature sensing signal for every predetermined cycle by sensing internal temperature of the ultrasonic water meter, wherein the central processing unit reads the temperature sensing signal input predetermined cycle from the temperature sensing unit, controls the freeze warning guide information for guiding the freeze warning to be collected and transmitted to the metering data in a case in which the temperature read during a freeze warning period of time is lower than the freeze warning temperature, and controls to output the freeze warning guide information through the information output unit to be recognizable.

Additionally, a dew condensation prevention device is in communication with a housing of the remote meter. The dew condensation prevention device includes: a through-hole penetrated at both sides; and a membrane filter which closes the through hole 203a of the dew condensation prevention device, facilitates inflow and outflow of air according to an air flow direction by ventilating air into the housing, facilitates discharge of internal heat and moisture of the housing, and prevents external moisture and dust from being introduced into the housing.

In addition, the central processing unit analyzes the calculated meter data, and controls to collect and transmit the water nonuse guide information guiding the nonuse of water for a long period of time to the metering data in a case in which the use of tap water is not sensed during a predetermined cumulative water non-use time, and controls to output a request for the living-along elderly check through the information output unit to be recognizable in a case in which the user is an elder who lives alone.

Moreover, the central processing unit checks the voltage of the lithium battery, which is the power supply unit, and controls the battery residual capacity guide information for warning the battery residual capacity to be collected and transmitted to the metering data in a case in which the checked voltage is lower than the warning voltage for warning the battery residual capacity, and controls to output the warning of the battery residual capacity through the information output unit to be recognizable.

Furthermore, the central processing unit analyzes the calculated meter data, and controls the partly filled pipe guide information for guiding a partly filled pipe, in which the fluid does not flow, to be collected and transmitted to the metering data in a case in which there is no fluid in the water pipe connector, and controls to output the partly filled pipe, in which the fluid does not flow, through the information output unit to be recognizable.

Additionally, the central processing unit analyzes the calculated meter data, and controls the interior leakage guide information for guiding the long-term use of water to be collected and transmitted to the metering data in a case in which the use of tap water is continuously sensed during the predetermined cumulative water use time, and controls to output the long-term use of water through the information output unit to be recognizable.

Moreover, the central processing unit analyzes the calculated meter data, and controls the backflow generation guide information for guiding the generation of the backflow in the water pipe to be collected and transmitted to the metering data in a case in which it is sensed that the fluid more than the predetermined fluid capacity flows in the water pipe connector in the reverse direction, and controls to output the backflow in the water pipe through the information output unit to be recognizable.

Furthermore, the central processing unit analyzes the calculated meter data, and controls the overflow guide information for guiding the generation of the overflow rate to be collected and transmitted to the metering data in a case in which it is sensed that the fluid more than the overflow rate, which is a flow rate exceeding the maximum flow rate of the fluid, flows through the water pipe connector.

In addition, the main screen output to the information output unit includes: an integrated flow rate display area on which a calculated flow rate, namely, an integrated amount of fluid flowing through the water pipe connector, is displayed; an instantaneous flow rate display area on which on which an instantaneous flow rate of the fluid flowing through the water pipe connector is displayed; an ultrasonic sensing display area activated when the instantaneous flow rate is more than a predetermined flow rate; a residual capacity warning display area activated when the residual capacity of a battery is insufficient; a partly filled pipe display area activated when there is no fluid in the water pipe connector; a backflow warning display area activated when the fluid flowing through the water pipe connector is reversed; a freeze warning display area activated when the internal temperature of the ultrasonic water meter is equal to or less than the freeze warning temperature; an internal water leakage display area activated when the use of tap water is continuously sensed during a predetermined cumulative water use time; and a living-alone elderly check display area activated when the use of tap water in a house where an elder who lives alone resides is not sensed during a predetermined cumulative water non-use time.

The remote metering system using an ultrasonic water meter according to the present invention can minimize power consumption by adopting a low power wide area communication network and a low power design optimized for a power usage according to a transmission cycle when metering data is transmitted by radio so as to extend a replacement cycle of a battery, thereby minimizing maintenance costs due to battery replacement.

Moreover, the remote metering system using an ultrasonic water meter according to the present invention discharges internal heat of the remote metering system to remove atmospheric pressure and moisture caused by a daily temperature difference.

Furthermore, the remote metering system using an ultrasonic water meter according to the present invention can not only monitor consumption of tap water but also guide a server manager to monitor internal temperature of the ultrasonic water meter, a long-term nonuse of tap water, a residual capacity of a battery, an interior water leakage, a back flow in a water pipe, a nonflow of the fluid in the water pipe, or an overflow rate, and the like.

Additionally, the remote metering system using an ultrasonic water meter according to the present invention has an effect of guiding a freezing warning to a user using the water meter.

In addition, the remote metering system using an ultrasonic water meter according to the present invention has an effect of requesting a guide of an elder who lives alone.

Moreover, the remote metering system using an ultrasonic water meter according to the present invention can perceivably guide it if the residual capacity of the battery is small.

Furthermore, the remote metering system using an ultrasonic water meter according to the present invention can perceivably guide it if there is no fluid in the water pipe connector.

Additionally, the remote metering system using an ultrasonic water meter according to the present invention can perceivably guide it if there is an internal water leakage from the water pipe connector.

Moreover, the remote metering system using an ultrasonic water meter according to the present invention can perceivably guide it if there is a back flow in the water pipe.

In addition, the remote metering system using an ultrasonic water meter according to the present invention can perceivably guide it if there is an overflow rate.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 9 is a view illustrating a customer information management screen provided by the metering server of the remote metering system according to the present invention;

FIG. 10 is a view illustrating a customer registration screen provided by the metering server of the remote metering system according to the present invention;

FIG. 11 is a view illustrating a customer correction screen provided by the metering server of the remote metering system according to the present invention;

FIG. 12 is a view illustrating a metering history management and inquiry screen provided by the metering server of the remote metering system according to the present invention;

FIG. 13 is a view illustrating a monthly living-alone elderly warning history screen provided by the metering server of the remote metering system according to the present invention;

FIG. 14 is a view illustrating a metering-related information setting screen provided by the metering server of the remote metering system according to the present invention;

DETAILED DESCRIPTION OF THE PREFERRED EMBODIMENT

Figure 1A:
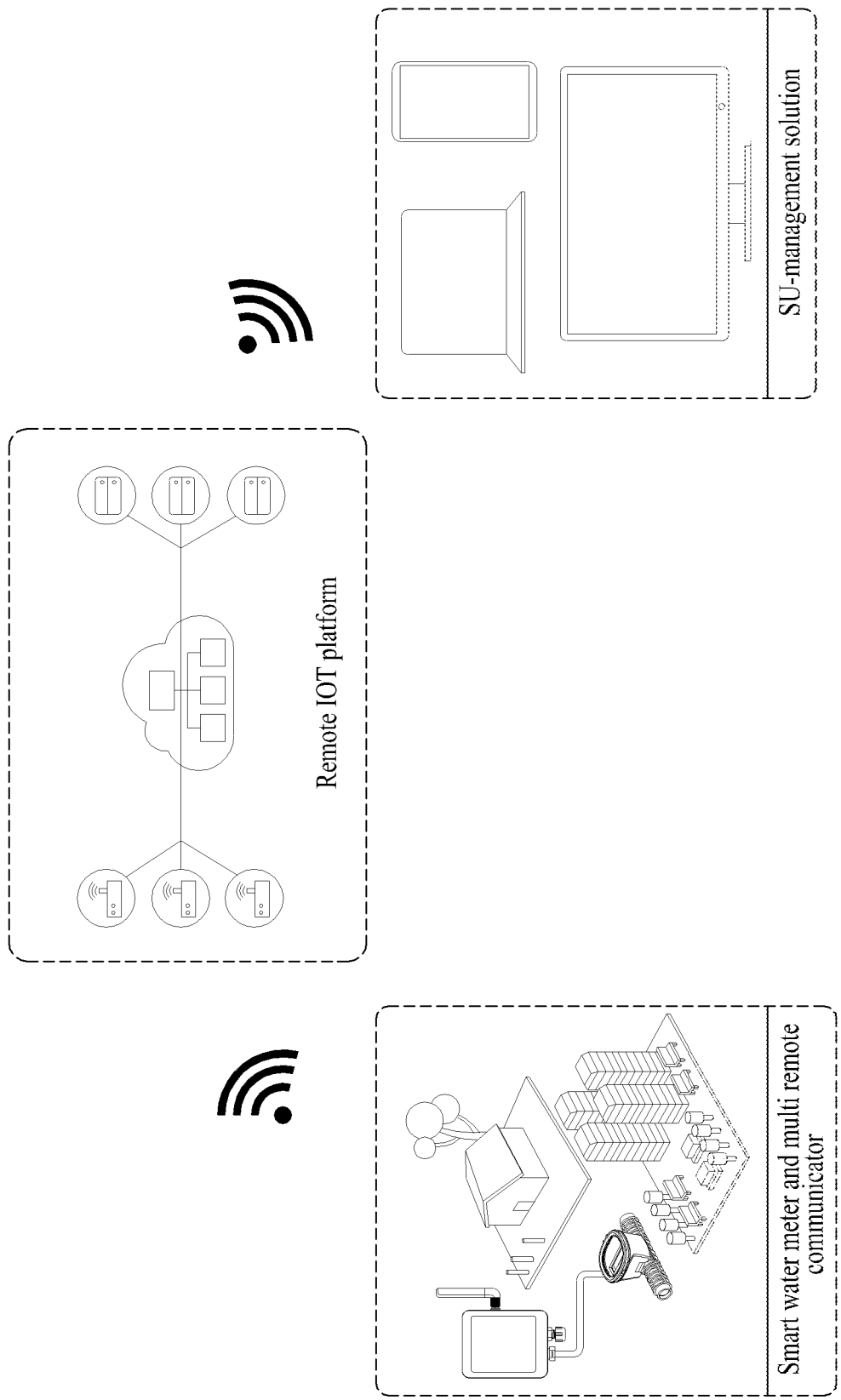
FIGS. 1A and 1B are diagrams illustrating the entire configuration of a remote metering system using an ultrasonic water meter according to an embodiment of the present invention.

Although the present invention has been described in detail with reference to the accompanying drawings, the invention can be modified in various forms and can have various embodiments. Specific embodiments will be illustrated in the drawings and described in detail. However, the embodiments are not intended to limit the invention, but it should be understood that the invention includes all modifications, equivalents, and replacements belonging to the concept and the technical scope of the invention.

In addition, in each drawing, sizes or thicknesses may be exaggerated or simplified for convenience of understanding, but the scope of the present disclosure is not limited thereto. In a case in which the same function is performed, the same reference numerals will be used to refer to the same components. Furthermore, the terms used herein are used for the purpose of describing the following embodiments and are not intended to be limiting of the present invention. As used herein, the singular forms are intended to include the plural forms as well, unless the context clearly indicates otherwise.

As shown in FIGS. 1 to 4, a remote metering system using an ultrasonic water meter according to an embodiment of the present invention can minimize power consumption by adopting a low power wide area communication network and a low power design optimized for a power usage according to a transmission cycle when metering data is transmitted by radio so as to extend a replacement cycle of a battery, thereby minimizing maintenance costs due to battery replacement. The remote metering system using the ultrasonic water meter according to the embodiment of the present invention includes an ultrasonic water meter 100, a remote metering device 200, and a metering server 300.

First, the ultrasonic water meter 100 is a member for calculating the amount of tap water based on an ultrasonic time difference measured according to a flow velocity of a fluid flowing through a water pipe connector 100 by ultrasonic irradiation.

In detail, the ultrasonic water meter 100 includes an ultrasonic sensor unit 110, a filter unit 120, an information output unit 130, an information storage unit 140, an information communication unit 150, a central processing unit 160, and a power supply unit 170.

First, the ultrasonic sensor unit 110 is a member which communicates with the water pipe connector 100 through which a fluid passes, irradiates ultrasonic waves to the fluid passing through the water pipe connector 100 through the pair of ultrasonic transducers, measures a difference between a first time that ultrasonic waves transmitted from one side are propagated to the other side through a reflector and a second time that the ultrasonic waves transmitted from the other side are propagated to the one side through the reflector, and generates a sensing signal.

The filter unit 120 is a member for filtering noise of the sensing signal generated by the ultrasonic sensor unit 110. Here, the noise-filtered sensing signal is input to the central processing unit 160 to be described later.

The information output unit 130 is a member for outputting metering-related information of the water meter, and may be one selected from various output members, such as a liquid crystal display (LCD), a thin film transistor-liquid crystal display (TFT-LCD), an organic light-emitting diode (OLED) display, a flexible display, a three-dimensional (3D) display, and the like.

Meanwhile, the main screen 400 is provided for the information output through the information output unit 130.

As described above, the output main screen 400 displays an integrated flow rate display area 410, an instantaneous flow rate display area 420, an ultrasonic sensing display area 430, a residual capacity warning display area 440, a partly filled pipe display area 450, a backflow warning display area 460, a freeze warning display area 470, an internal water leakage display area 480, and a living-alone elderly check display area 490.

As described above, the integrated flow rate display area 410 is an image area on which a calculated flow rate, namely, an integrated amount of fluid flowing through the water pipe connector 100 is displayed, and displays the calculated flow rate as a total number of ten digits including the decimal point, thereby displaying the cumulative usage capacity.

The instantaneous flow rate display area 420 is an image area on which an instantaneous flow rate of the fluid flowing through the water pipe connector 100 is displayed, and displays the instantaneous flow rate as a total number of five digits.

The ultrasonic sensing display area 430 is an image area activated when the instantaneous flow rate is 0.9 l/h or more, which is a predetermined flow rate.

Here, the activation may be provided through various methods such as lighting or flickering of the corresponding area.

The residual capacity warning display area 440 is an image area activated when the residual capacity of the battery is insufficient, that is, when voltage of the battery is 2.7V or less.

Here, the battery refers to a lithium battery representing the power supply unit 170 which will be described later.

The partly filled pipe display area 450 is an image area activated when there is no fluid in the water pipe connector 100.

The backflow warning display area 460 is an image area activated when the fluid flowing through the water pipe connector 100 is reversed.

Here, the backflow is based on a case in which there is a flow of 1 L or more in the reverse direction.

The freeze warning display area 470 is an image area activated when the internal temperature of the ultrasonic water meter 100 is equal to or less than the freeze warning temperature.

Here, the freeze warning temperature is about 2° C., namely, is based on temperature maintained at about 2° C. for about 3 hours or more.

The interior water leakage display area 480 is an image area activated when the use of tap water is continuously sensed during a predetermined cumulative water use time.

Here, the cumulative water use time is about 7 days or more.

The living-alone elderly check display area 490 is an image area activated when the use of tap water in a house where an elder who lives alone resides is not sensed during a predetermined cumulative water non-use time.

Here, in a case in which the ultrasonic water meter 100 is installed, it is checked a resident is an elder who lives alone. In a case in which the resident is an elder who lives alone, it is programmed that the living-alone elderly check display area 490 is displayed when the cumulative water use time is seven days or more. Alternatively, when the remote metering device 200 collects user identification information to the metering data and transmits the data to the metering server 300, the metering server 300 checks the user is an elder who lives alone on reference to the user identification information collected to the metering data, and notifies the ultrasonic water meter 100 of the elder who lives alone via the remote metering device 200. Thereafter, the central processing unit 160 of the ultrasonic water meter 100 controls the living-alone elderly check display area 490 to be activated when the use of tap water is not sensed during a predetermined cumulative water non-use time and when it is notified that the user is an elder who lives alone.

The information storage unit 140 is an member storing metering-related information of the water meter like the metering data, and is composed of one or combination of a memory (for instance, an SD memory, an XD memory, or the like) of a flash memory type, a hard disk type, a multimedia card micro type, or a card type, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disk. Preferably, the information storage unit 140 uses a memory type which does not lose the stored metering data even if there is no battery residual capacity of the power supply unit 170.

The information communication unit 150 is a member performing a communication interface function in which the metering-related information, such as the metering data, of the water meter is received or transmitted to the remote metering device 200, and uses a serial communication interface including a transistor transistor losic (TTL) communication interface or an RS-232 communication interface.

The central processing unit 160 receives the sensing signal through the ultrasonic sensor unit 110, calculates the velocity of the fluid by the input sensing signal using the difference between the first time and the second time, multiplies the calculated velocity of the fluid by the cross-sectional area of the pipe connector 100 to generate metering data, which is the calculated flow rate, every predetermined cycle, and controls the data to be transmitted through the information output unit 130 by cable.

Here, the remote metering device 200 is a member receiving the metering data from the ultrasonic water meter 100 by cable for every predetermined cycle, and is a relay member for wirelessly transmitting the metering data four times a day to the metering server 300, which will be described later.

The remote meter 200 for performing such a function includes a circuit board mounted in a housing 201 and including a communication module board on which a USIM for identifying a user is mounted, a battery (primary battery) for supplying power to the corresponding circuit board, and a wireless antenna 202 provided at one side of the housing 201, thereby performing the function of collecting and transmitting user identification information to the metering data.

Moreover, a dew condensation prevention device 203 is in communication with the housing 201 of the remote meter

200. The dew condensation prevention device 203 includes: a through-hole 203a penetrated at both sides; and a membrane filter 203b which closes the through hole 203a of the dew condensation prevention device 203, facilitates inflow and outflow of air according to an air flow direction by ventilating air into the housing 201, facilitates discharge of internal heat and moisture of the housing 201, and prevents external moisture and dust from being introduced into the housing 201.

Accordingly, the membrane filter 203b provides an effect of removing atmospheric pressure and moisture caused by the daily temperature difference by discharging the internal heat of the housing 201. The air permeability of the membrane filter 203b is about 3,681 m./min per 1 cm$^2$.

The power supply unit 170 is a member for supplying power for driving.

Accordingly, in a state in which the predetermined cycle of the metering data is set in such a way that the ultrasonic water meter 100 measures the metering data once per minimum one hour, in order to maximize a useful life for securing electric energy necessary for driving the components of the ultrasonic water meter 100 including the ultrasonic sensor unit 110, the filter unit 120, the information output unit 130, the information storage unit 140, the information communication unit 150, and the central processing unit 160, the power supply unit 170 is specified as a lithium battery, which is a primary battery. The ultrasonic water meter 100 is designed at low power in which capacity of the lithium battery is 3,650,000 μAh, the voltage of the lithium battery is 3.6 V, current consumption per hour is 43.33333 μAh, a self-discharge rate is 36,500 μAh per year, and the expected lifespan is at least eight years.

Furthermore, the remote metering system using the ultrasonic water meter according to the present invention further includes a metering server 300, which is connected to the remote metering device 200 through a low power wide area communication network to receive metering data from the remote metering device 200 for every predetermined cycle.

Additionally, the low-power wide area communication network is composed of any one or combination of a LoRa communication network, and a NBIoT communication network, and the battery for the remote metering device 200 is serviceable for a long period of time.

Here, the metering server 300 performs a function of guiding a server manager to monitor a user's cumulative water consumption.

The metering server 300 has a DB unit for storing various information for monitoring the water consumption.

As described above, the DB unit includes a cumulative water consumption information DB by family members, which stores and manages water consumption according to user identification information for identifying users, contact information of a user terminal of the corresponding user, the number of family members of the corresponding user, gender of the family members, age of the family members, and the like.

Additionally, the metering server 300 also performs a function of guiding the server manager to monitor water consumption, internal temperature of the ultrasonic water meter 100, non-use of water for a long period of time, a battery residual capacity, an internal leakage, a backflow of the water pipe, a nonflow of the fluid in the water pipe, and generation of an overflow rate.

Accordingly, the ultrasonic water meter 100 performs the following functions.

First, the ultrasonic water meter 100 includes a temperature sensing unit 180 embedded therein for a freeze warning.

The temperature sensing unit 180 senses the internal temperature of the ultrasonic water meter 100 and generates a temperature sensing signal for every predetermined cycle.

Accordingly, the central processing unit 160 reads the temperature sensing signal input predetermined cycle from the temperature sensing unit 180, controls the freeze warning guide information for guiding the freeze warning to be collected to the metering data and to be transmitted to the remote metering device 200 in a case in which the temperature read during a freeze warning period of time is lower than the freeze warning temperature, and controls the freeze warning display area 470, which is displayed on the main screen 400 output to the information output unit 130, to be activated so that the user can recognize the freeze warning guide through the information output unit 130.

Meanwhile, the remote metering device 200 relays the metering data, in which the freeze warning guide information is collected, to the metering server 300.

In addition, in order to request a living-alone elderly check, the central processing unit 160 analyzes the calculated meter data, and controls to collect the water nonuse guide information guiding the nonuse of water for a long period of time and transmit the metering data to the remote metering device 200 in a case in which the use of tap water is not sensed during a predetermined cumulative water non-use time, and controls such that the living-alone elderly check display area 490 displayed on the main screen 400 output to the information output unit 130 is activated so that the request for the living-along elderly check can be recognized through the information output unit 130 in a case in which the user is an elder who lives alone.

Meanwhile, the remote metering device 200 relays the metering data, to which the water nonuse guide information is collected, to the metering server 300.

In addition, in a case in which the battery residual capacity is small, in order to allow the user to recognize that the battery residual capacity is small, the central processing unit 160 checks the voltage of the lithium battery, which is the power supply unit 170, and controls the battery residual capacity guide information for warning the battery residual capacity to be collected to the metering data and transmitted to the remote metering device 200 in a case in which the checked voltage is lower than the warning voltage for warning the battery residual capacity, and controls the residual capacity warning display area 440, which is displayed on the main screen 400 output to the information output unit 130, to be activated so that the warning of the battery residual capacity can be recognized through the information output unit 130.

Meanwhile, the remote metering device 200 relays the metering data, to which the battery residual capacity guide information is collected, to the metering server 300.

Moreover, in a case in which there is no fluid in the water pipe connector 100, in order to allow the user to recognize that there is no fluid in the water pipe connector, the central processing unit 160 analyzes the calculated meter data, and controls the partly filled pipe guide information for guiding a partly filled pipe, in which the fluid does not flow, to be collected to the metering data and transmitted to the remote metering device 200 in a case in which there is no fluid in the water pipe connector 100, and controls the partly filled pipe display area 450, which is displayed on the main screen 400 output to the information output unit 130, to be activated so that the partly filled pipe, in which the fluid does not flow can be recognized through the information output unit 130.

Meanwhile, the remote metering device 200 relays the metering data, to which the partly filled pipe guide information is collected, to the metering server 300.

Additionally, in order to allow the user to recognize an internal leakage, the central processing unit 160 analyzes the calculated meter data, and controls the interior leakage guide information for guiding the long-term use of water to be collected to the metering data and transmitted to the remote metering device 200 in a case in which the use of tap water is continuously sensed during the predetermined cumulative water use time, and controls the interior leakage display area 480, which is displayed on the main screen 400 output to the information output unit 130, to be activated so that the long-term use of water can be recognized through the information output unit 130.

Meanwhile, the remote metering device 200 relays the metering data, to which the interior leakage guide information is collected, to the metering server 300.

In addition, in order to allow the user to recognize a backflow in the water pipe, the central processing unit 160 analyzes the calculated meter data, and controls the backflow generation guide information for guiding the generation of the backflow in the water pipe to be collected to the metering data and transmitted to the remote metering device 200 in a case in which it is sensed that the fluid more than the predetermined fluid capacity flows in the water pipe connector 100 in the reverse direction, and controls the backflow warning display area 460, which is displayed on the main screen 400 output to the information output unit 130, to be activated so that the backflow in the water pipe can be recognized through the information output unit 130.

Meanwhile, the remote metering device 200 relays the metering data, to which the backflow guide information is collected, to the metering server 300.

Furthermore, in a case in which overflow rate is generated through the water pipe connector 100, in order to allow the user to recognize it, the central processing unit 160 analyzes the calculated meter data, and controls the overflow guide information for guiding the generation of the overflow rate to be collected to the metering data and transmitted to the remote metering device 200 in a case in which it is sensed that the fluid more than the overflow rate, which is a flow rate exceeding the maximum flow rate of the fluid, flows through the water pipe connector 100.

Meanwhile, the remote metering device 200 relays the metering data, to which the overflow guide information is collected, to the metering server 300.

Additionally, the manager of the metering server 300 receives the monitoring service from the metering server 300 through the transmitted metering data.

Figure 5:
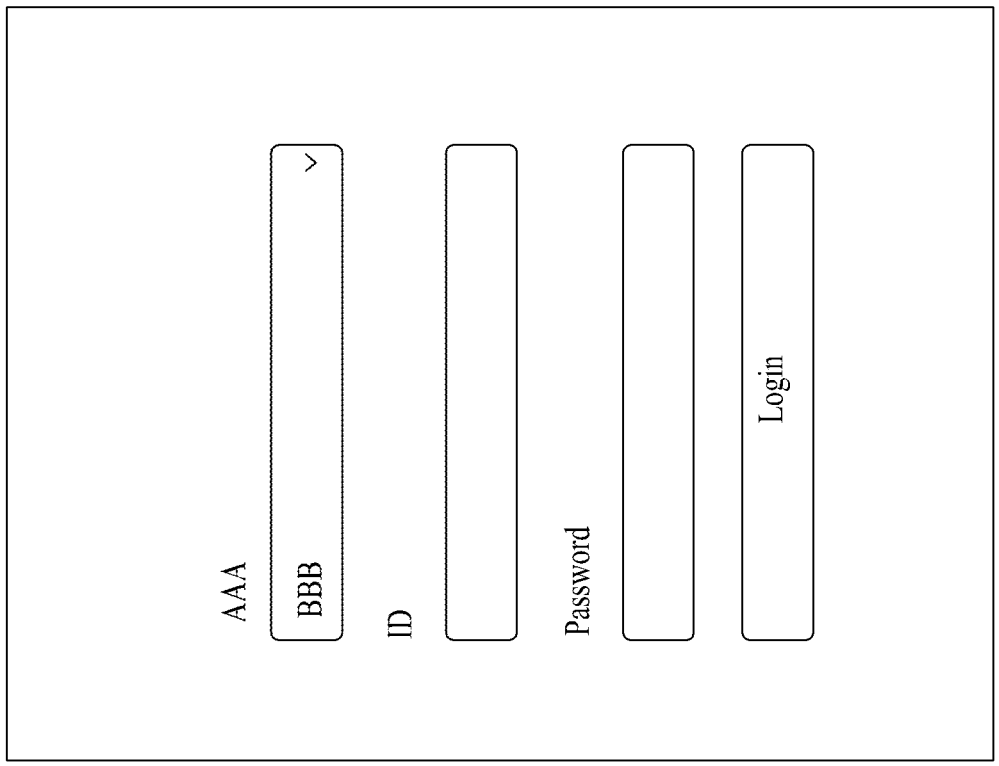
FIG. 5 is a view illustrating a login screen provided by a metering server of the remote metering system according to the present invention.

First, referring to FIG. 5, in order to receive the monitoring service, the manager logs in by using the manager's ID and password through a log-in screen provided by the metering server 300.

Figure 6:
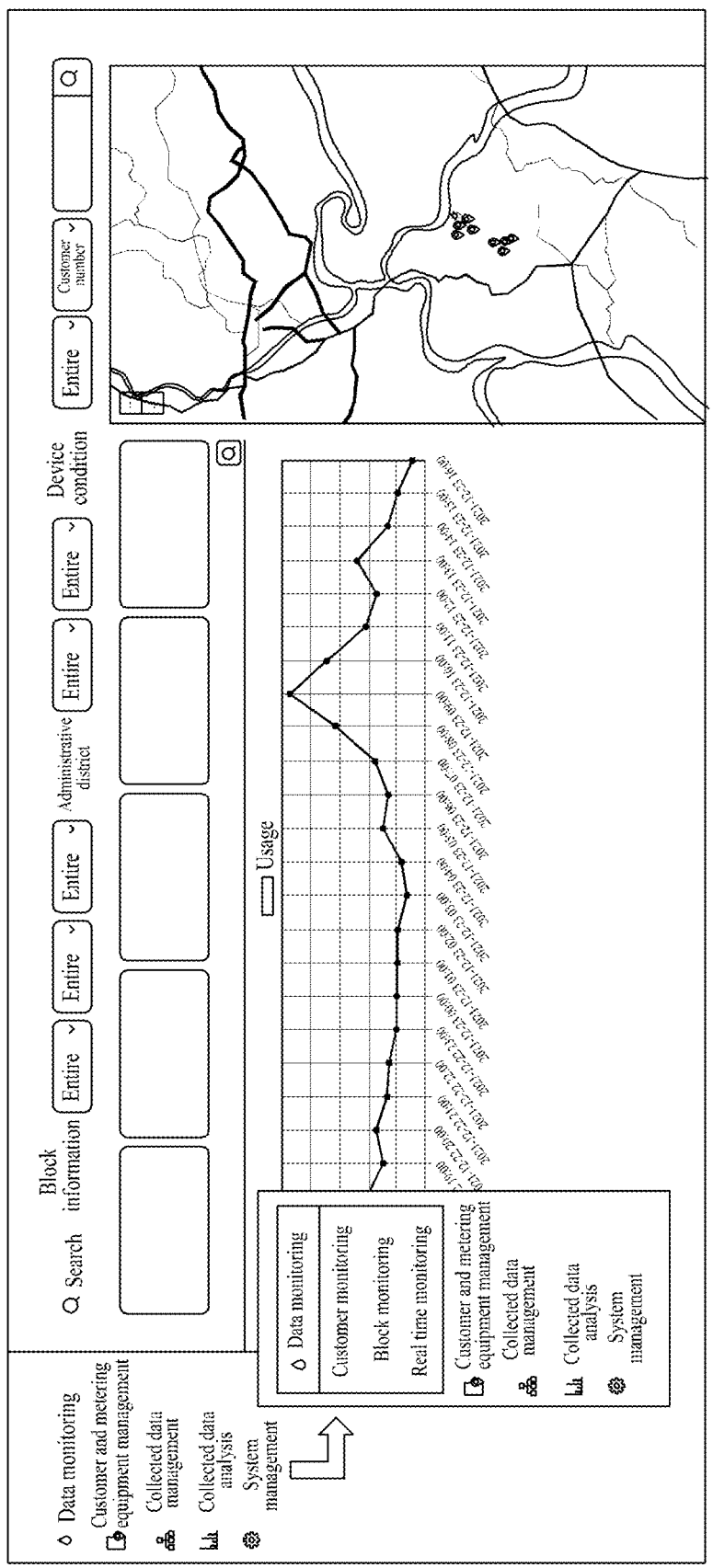
FIG. 6 is a view illustrating a main screen provided by the metering server of the remote metering system according to the present invention.

Thereafter, the metering server 300 outputs the main screen with reference to FIG. 6.

A main menu area including [Data monitoring], [Customer and metering equipment management], [Collected data management], [Collected data analysis], and [System management] is displayed on the left side of the output main screen, and a sub menu area is displayed in a drop-down format when any one of the main menu areas is selected.

Furthermore, a content information area, in which content information on the selected sub menu among the sub menus displayed in the drop-down format is displayed, is displayed on the right side of the main screen, and a login information area in which information on a log-in manager is displayed and a menu hide/display area for hiding or displaying the main menu area are displayed at the top of the main screen.

Figure 7:
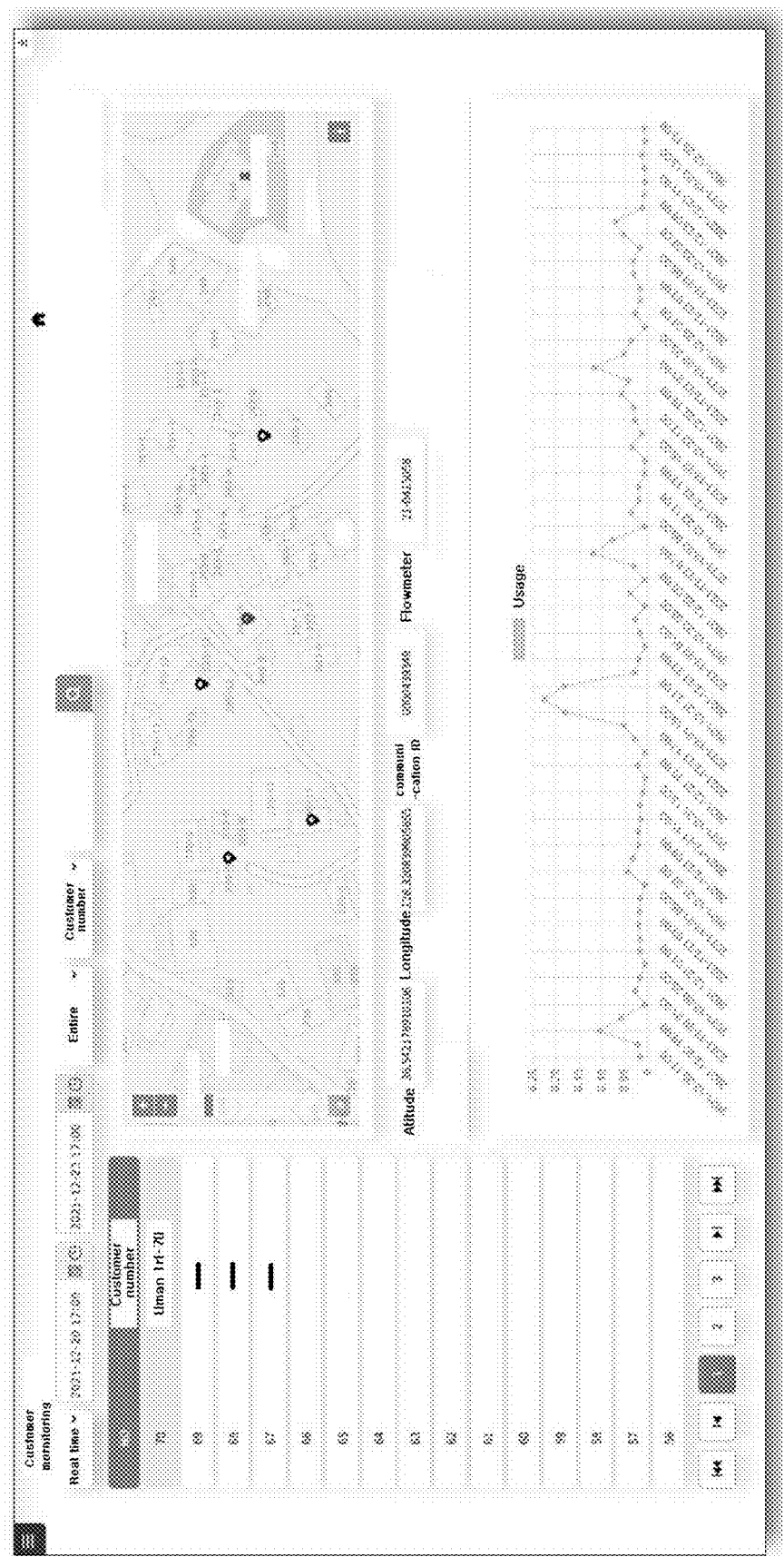
FIG. 7 is a view illustrating a metering monitoring screen for each customer provided by the metering server of the remote metering system according to the present invention.

Referring to FIG. 7, the metering server 300 guides to output a customer metering monitoring screen when the manager selects a [Customer monitoring] menu among the sub menus on the main screen.

As described above, a combo box for setting inquiry conditions is displayed at the top of the customer metering monitoring screen to be output. After setting of the inquiry conditions, when the manager manipulates a button, the corresponding information is output to the content information area of the lower part.

Meanwhile, in the case of the content information area, when the user clicks a customer number of the left area, the corresponding customer location is displayed on the map of the right area, and then, the latitude and longitude information and a USIM number of the system installed at the corresponding customer's house, a remote communicator number, and a meter facility number are displayed.

The inquiry conditions includes search divisions of real-time, daily and monthly time divisions, customer number, customer name, and customer address. The metering warning includes overflow, backflow, interior leakage, partly filled pipe, an elder who lives alone, low battery (Bat.Low), freeze warning, wired communication, wireless communication, and long-term nonuse.

Figure 8:
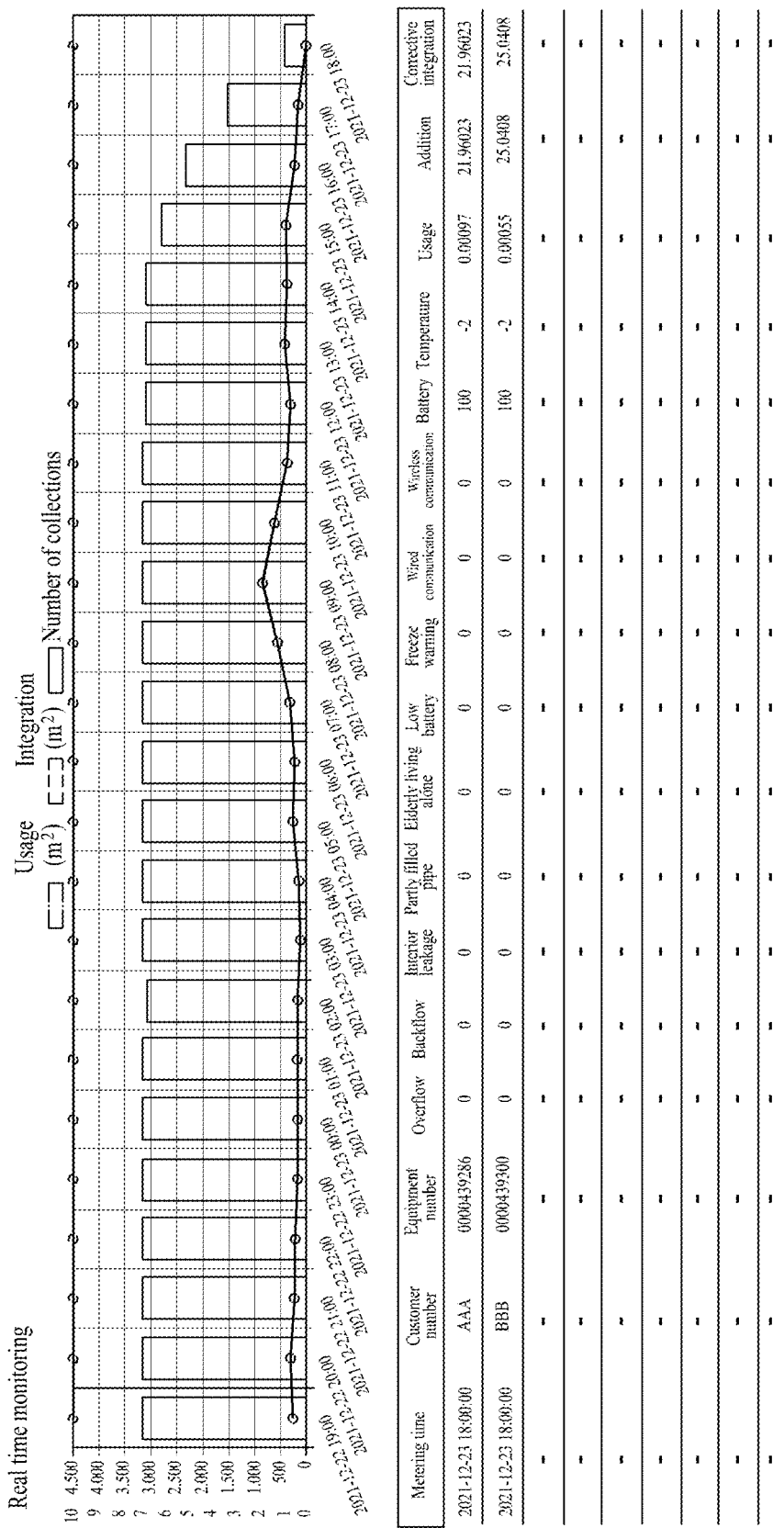
FIG. 8 is a view illustrating a real time metering monitoring screen for each customer provided by the metering server of the remote metering system according to the present invention.

Referring to FIG. 8, the metering server 300 outputs a customer real time metering monitoring screen when the manager selects a [real-time monitoring] menu among the sub menus of the main screen.

The customer real time metering monitoring screen is a screen for automatically renewing and displaying 24-hour metering data for every minute. A graph area of the top displays the number of collected data, the sum of used quantity per hour, and the sum of cumulative integrations by time, and a grid area of the bottom displays a metering result by each customer.

Referring to FIG. 9, the metering server 300 outputs a customer information management screen to manage information of the customer when the manager selects the [Customer management] menu among the sub menus of the main screen.

Here, the customer information management is managed through the customer registration screen for registering the customer with reference to FIG. 10 and a customer correction screen for correcting information on the registered customer with reference to FIG. 11. The customer information management guides to treat alarm and warning of an elder who lives alone according to whether the customer is an elder who lives alone or not, guides selectable metering methods, such as remote metering, visit, and self-metering. Thereafter, when the customer selects visit, the customer information management guides the customer to designate a meterman and register offline data.

Accordingly, the customer registration screen includes a customer number input box for inputting a customer number, a customer name input box for inputting a customer name, an administrative district code input box for inputting an administrative district code, a customer address input box for inputting a customer address, a living-alone elderly display box for inputting whether or not the customer is an elder who lives alone, and a metering method input box for inputting a metering method.

Referring to FIG. 12, the metering server 300 outputs a metering history management and inquiry screen for allowing the customer to inquire the metering history when the manager selects the [Metering history management] menu among the sub menus of the main screen.

As described above, the combo box for setting the metering history inquiry conditions is displayed at the top of the metering history management and inquiry screen. After setting the metering history inquiry conditions, when the manager manipulates the button, the corresponding information is output to the content information area of the lower part.

Here, the inquiry conditions include the customer number, the customer name, and the customer address. When the customer number is selected, detailed information on the metering history of the corresponding customer is displayed.

Figure 13:
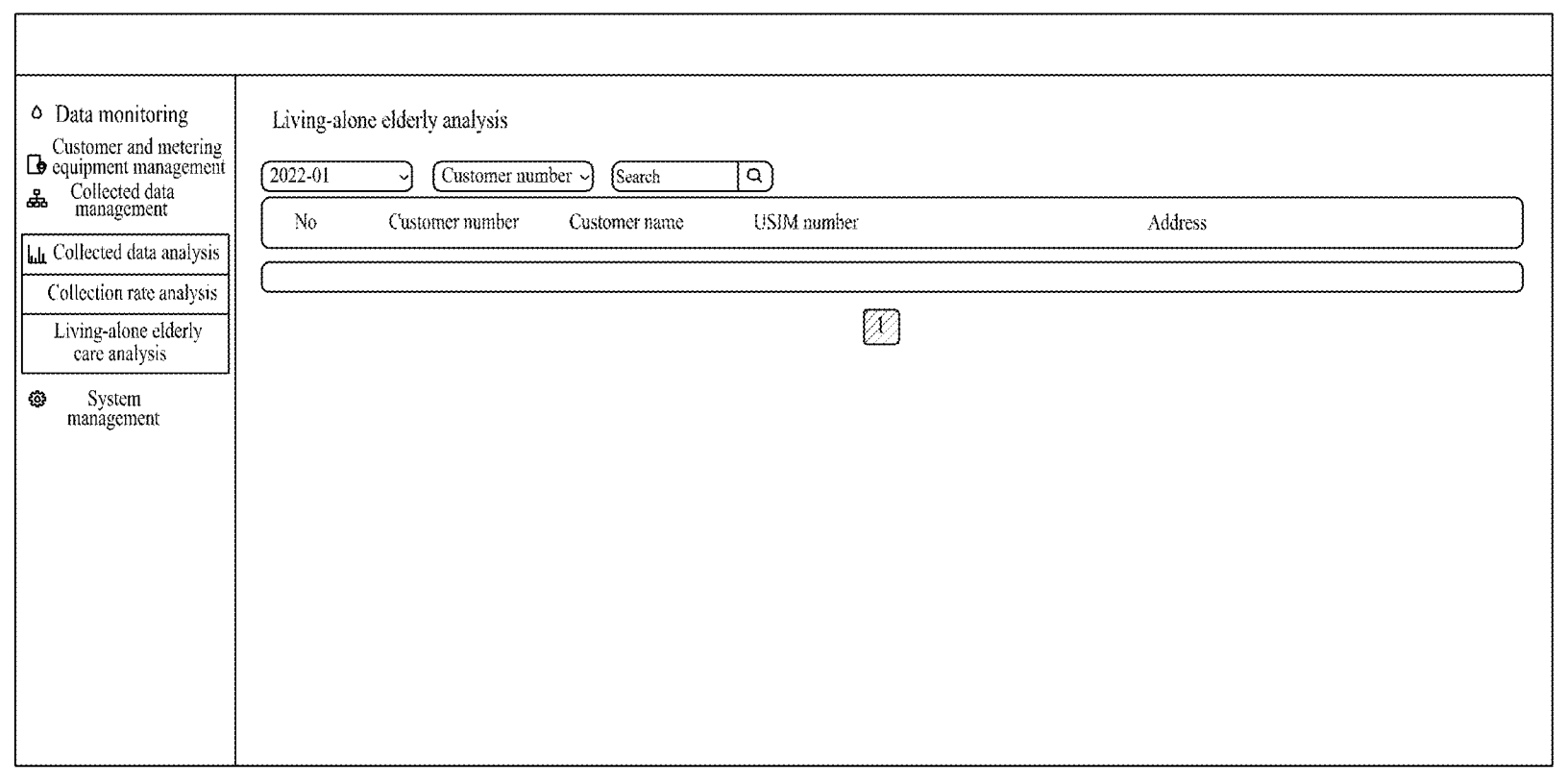

Referring to FIG. 13, when the manager selects a [Living-alone elderly care analysis] menu among the sub menus of the main screen, the metering server 300 outputs a monthly living-alone elderly warning history screen showing the number of monthly warnings of living-alone elders.

As described above, the combo box for setting the living-alone elderly inquiry conditions is displayed at the top of the monthly living-alone elderly warning history screen. After setting the living-alone elderly inquiry conditions, when the manager manipulates the button, the corresponding information is output to the content information area of the lower part.

Here, the inquiry conditions include year and month, the customer number, the customer name, the customer address, and the USIM number. When the customer number is selected, detailed information on the metering history of the corresponding customer is displayed.

Referring to FIGS. 14 and 15, when the manager selects a [System setting] menu among the sub menus of the main screen, the metering server 300 outputs a metering-related warning setting screen for guiding the manager to set and monitor generation of metering-related warnings including overflow, backflow, interior leakage, partly filled pipe, an elder who lives alone, low battery (Bat.Low), freeze warning, wired communication, wireless communication, and long-term nonuse.

In other words, out of the metering-related information, the long-term nonuse is checked as 0 every hour and a warning is generated when the long-term nonuse is continuously generated for more than a predetermined time (24 hours). In connection with the wireless communication error, an error is checked every hour and a warning is generated when the error is continuously generated for more than a predetermined time (12 hours). In connection with the wired communication error, an is checked every hour and a warning is generated when the error is continuously generated for more than a predetermined time (12 hours). In connection with the freeze warning, an error checks an error every hour and a warning is generated when the error is continuously generated for more than a predetermined time (3 hours). In connection with the low battery (Bat.Low), an error is checked every hour and a warning is generated when the low battery is continuously generated for more than a predetermined time (1 hour). In connection with the elder who lives alone, a living-alone elderly item is set in the customer information, an error is checked every hour and a warning is generated when the error is continuously generated for more than a predetermined time (72 hours). In connection with the partly filled pipe, an error is checked every hour and a warning is generated when the error is continuously generated for more than a predetermined time (48 hours). In connection with the interior leakage, an error is checked every hour and a warning is generated when the error is continuously generated for more than a predetermined time (4 hours). In connection with the backflow, an error is checked every hour and a warning is generated when the error is continuously generated for more than a predetermined time (12 hours). In connection with the overflow, an error is checked every hour and a warning is generated when the error is continuously generated for more than a predetermined time (12 hours). Therefore, the manager can react quickly to the errors.

As described above, the present invention has been illustrated and described with reference to the specific exemplary embodiment, but it will be easily understood by those with ordinary skill in the technical field to which the present invention pertains that various alterations and modifications may be made without departing from the technical spirit and the scope of the present invention disclosed in claims.

DRAWINGS

Figure 1B:
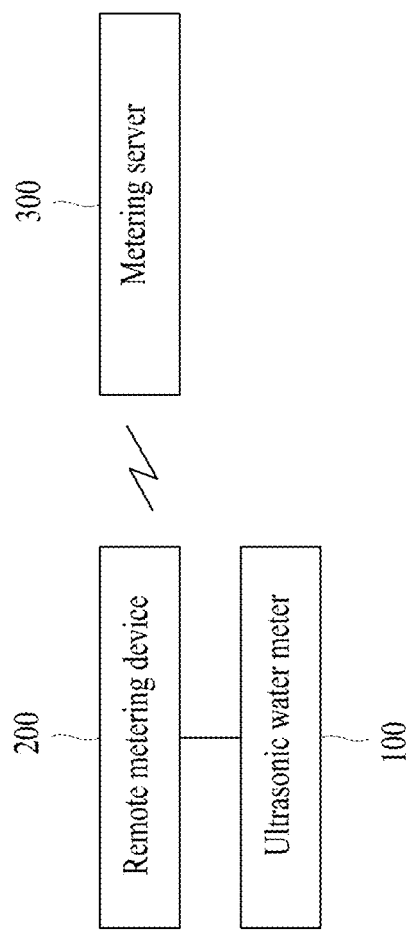
Figure 2:
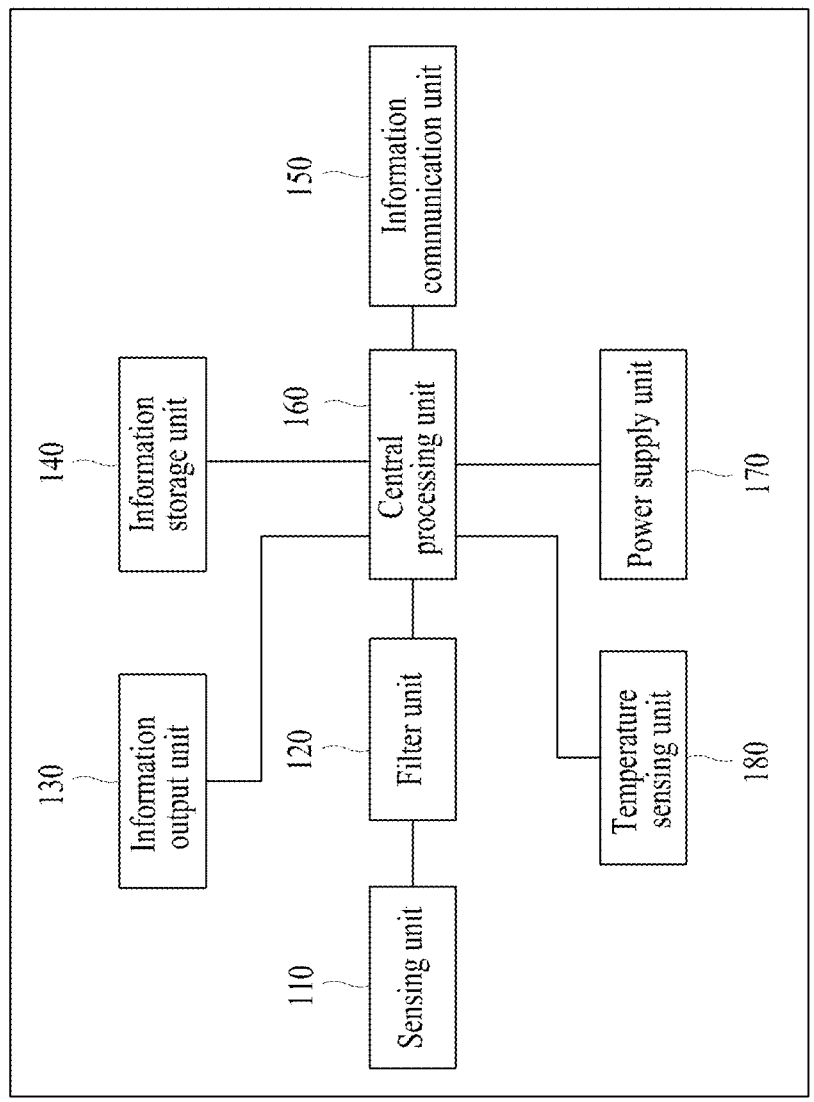
FIG. 2 is a block diagram illustrating an ultrasonic water meter of the remote metering system according to the present invention.
Figure 3:
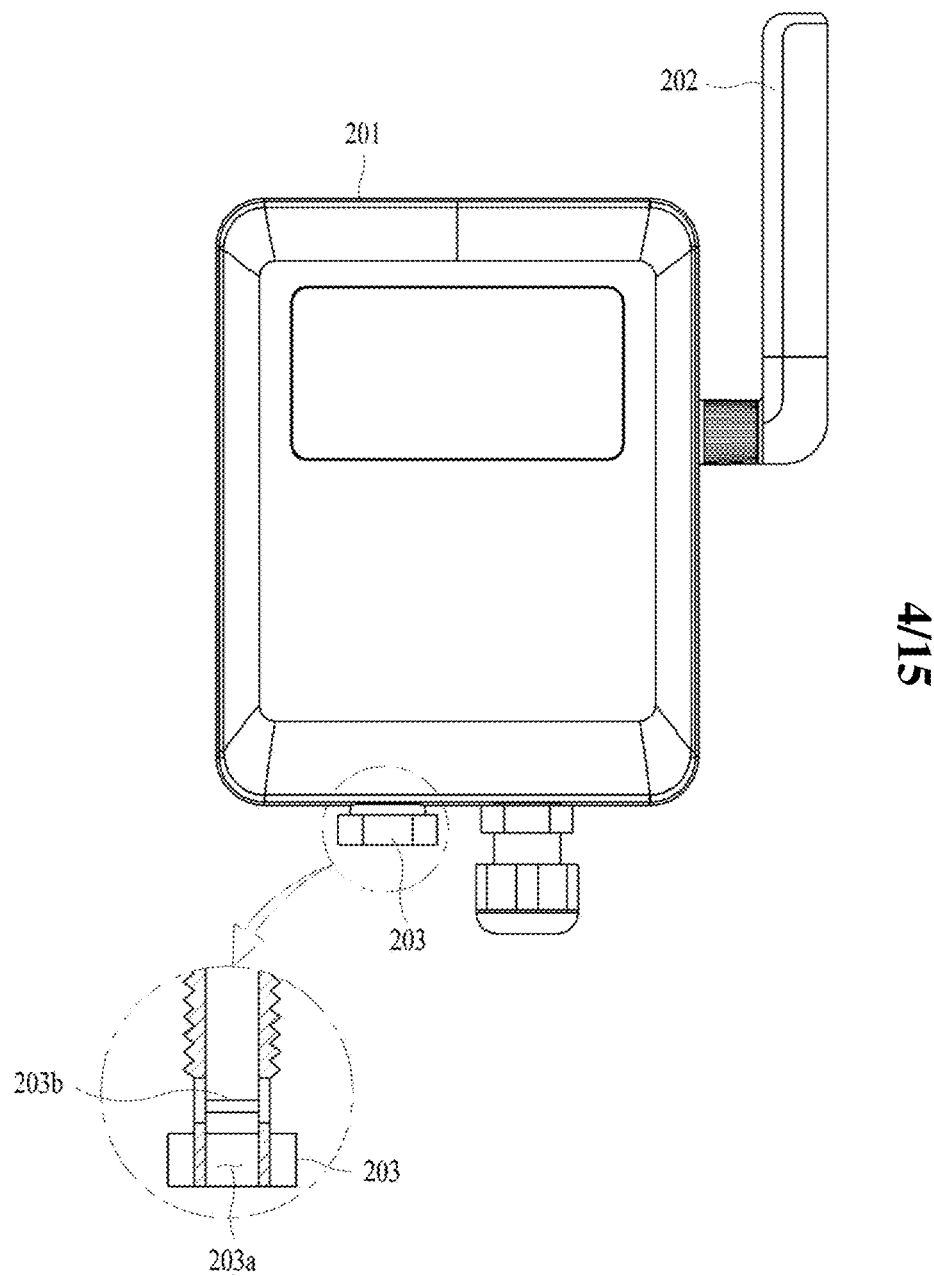
FIG. 3 is a view illustrating a remote metering device of the remote metering system according to the present invention.
Figure 4:
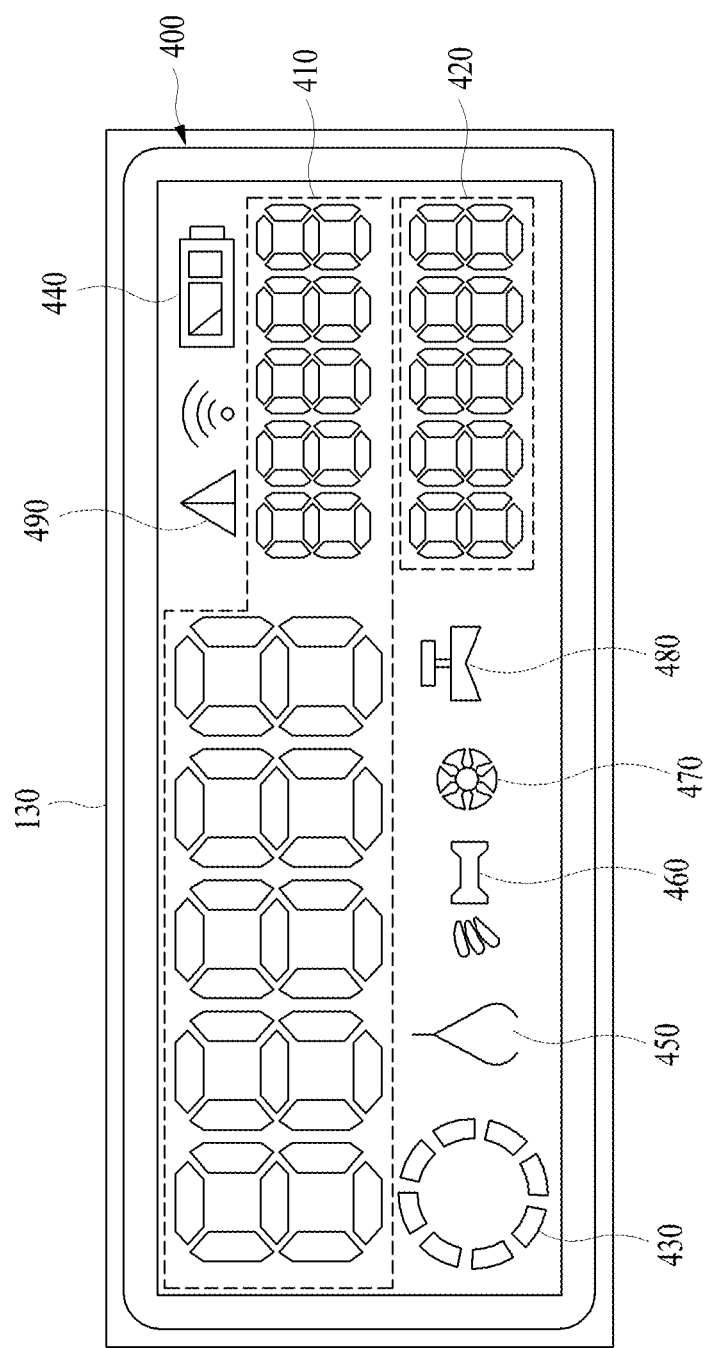
FIG. 4 is a view illustrating a main screen output through an information output unit of the remote metering system according to the present invention.

FIG. 1B
200: Remote metering device
100: Ultrasonic water meter
300: Metering server
FIG. 2
110: Sensing unit
120: Filter unit
130: Information output unit
140: Information storage unit
150: Information communication unit
160: Central processing unit
170: Power supply unit

What is claimed is:

1. A remote metering system using an ultrasonic water meter, the remote metering system comprising:
the ultrasonic water meter, which includes:
an ultrasonic sensor unit communicating with a water pipe connector through which a fluid passes, irradiating ultrasonic waves to the fluid passing through the water pipe connector through a pair of ultrasonic transducers, measuring a difference between a first time that the ultrasonic waves transmitted from one side of the water pipe connector are propagated to the other side of the water pipe connector through a reflector and a second time that the ultrasonic waves transmitted from the other side of the water pipe connector are propagated to the one side of the water pipe connector through the reflector, and generating a sensing signal;
an information output unit for outputting metering-related information of the ultrasonic water meter;
an information storage unit storing the metering-related information of the ultrasonic water meter;
an information communication unit performing a communication interface function by which the metering-related information of the ultrasonic water meter is transmitted and received;
a central processing unit receiving the sensing signal through the ultrasonic sensor unit, calculating the velocity of the fluid by inputting the sensing signal and using the difference between the first time and the second time, multiplying the calculated velocity of the fluid by the cross-sectional area of the water pipe connector to generate metering data, which is a calculated flow rate, for a predetermined cycle, and controlling the metering data to be transmitted through the information output unit; and a power supply unit for supplying power for driving; and a remote metering device receiving the metering data from the ultrasonic water meter for the predetermined cycle,
wherein the predetermined cycle of the metering data is at least once per hour,
wherein the power supply unit is a lithium battery, capacity of the lithium battery is 3,650,000 µAh, a voltage of the lithium battery is 3.6 V, current consumption per hour of the lithium battery is 43.33333 µAh, a self-discharge rate of the lithium battery is 36,500 µAh per year, and an expected lifespan of the lithium battery is at least eight years.

2. The remote metering system according to claim 1, further comprising:
a metering server connected with the remote metering device via a low power wide area communication network and receiving the metering data from the remote metering device for the predetermined cycle,
wherein the low power wide area communication network includes any one or combination of a LoRa communication network, and a NBIOT communication network.

3. The remote metering system according to claim 1, further comprising:
a temperature sensing unit embedded in the ultrasonic water meter and generating a temperature sensing signal for the predetermined cycle by sensing internal temperature of the ultrasonic water meter,
wherein the central processing unit reads the generated temperature sensing signal from the temperature sensing unit, controls freeze warning guide information for guiding a freeze warning to be collected and transmitted to the metering data in a case in which the internal temperature read during a freeze warning period of time is lower than freeze warning temperature, and controls the information output unit to output the freeze warning guide information.

4. The remote metering system according to claim 1, wherein a dew condensation prevention device is in communication with a housing of the remote metering device, and
wherein the dew condensation prevention device comprises: a through-hole penetrated at both sides; and a membrane filter which closes the through hole of the dew condensation prevention device, facilitates inflow and outflow of air according to an air flow direction by ventilating the air into the housing, facilitates discharge of internal heat and moisture of the housing, and prevents external moisture and dust from being introduced into the housing.

5. The remote metering system according to claim 1, wherein the central processing unit analyzes the generated metering data, and controls water nonuse guide information guiding nonuse of water for a period of time to be collected and transmitted to the metering data in a case in which use of tap water is not sensed during a predetermined cumulative water non-use time, and controls the information output unit to output a request for checking an elder who lives alone in a case in which a user is the elder who lives alone.

6. The remote metering system according to claim 1, wherein the central processing unit checks the voltage of the lithium battery and controls battery residual capacity guide information for warning battery residual capacity to be collected and transmitted to the metering data in a case in which the checked voltage is lower than a warning voltage for warning the battery residual capacity, and controls the information output unit to output the warning of the battery residual capacity.

7. The remote metering system according to claim 1, wherein the central processing unit analyzes the generated metering data, and controls filled pipe guide information for guiding a filled pipe in which the fluid does not flow to be collected and transmitted to the metering data in a case in which there is no fluid in the water pipe connector, and controls the information output unit to output the filled pipe guide information by representing the filled pipe in which the fluid does not flow.

8. The remote metering system according to claim 1, wherein the central processing unit analyzes the generated metering data, and controls interior leakage guide information for guiding use of water to be collected and transmitted to the metering data in a case in which use of tap water is continuously sensed during a predetermined cumulative water use time, and controls the information output unit to output the interior leakage guide information by representing the use of water.

9. The remote metering system according to claim 1, wherein the central processing unit analyzes the generated metering data, and controls backflow generation guide information for guiding generation of backflow in the water pipe connector to be collected and transmitted to the metering data in a case in which it is sensed that a fluid more than a predetermined fluid capacity flows in the water pipe connector in a reverse direction, and controls the information output unit to output the backflow generation guide information by representing the backflow in the water pipe connector.

10. The remote metering system according to claim 1, wherein the central processing unit analyzes the generated metering data, and controls overflow guide information for guiding generation of the overflow rate to be collected and transmitted to the metering data in a case in which it is sensed that a fluid more than an overflow rate, which is a flow rate exceeding a maximum flow rate of the fluid, flows through the water pipe connector.

11. The remote metering system according to claim 1, the information output unit further comprising a main screen,
wherein the main screen comprises:
an integrated flow rate display area on which the calculated flow rate including an integrated amount of fluid flowing through the water pipe connector is displayed;
an instantaneous flow rate display area on which an instantaneous flow rate of the fluid flowing through the water pipe connector is displayed;
an ultrasonic sensing display area activated when the instantaneous flow rate is more than a predetermined flow rate;
a residual capacity warning display area activated when a residual capacity of the lithium battery is insufficient;
a filled pipe display area activated when there is no fluid in the water pipe connector;
a backflow warning display area activated when the fluid flowing through the water pipe connector is reversed;
a freeze warning display area activated when internal temperature of the ultrasonic water meter is equal to or less than freeze warning temperature;
an internal water leakage display area activated when use of tap water is continuously sensed during a predetermined cumulative water use time; and
a living-alone elderly check display area activated when use of tap water in a house where an elder who lives alone resides is not sensed during a predetermined cumulative water non- use time.

\* \* \* \* \*